United States Patent [19]

Moruzzi

[11] Patent Number: 5,531,550
[45] Date of Patent: Jul. 2, 1996

[54] CLAMP RELEASE MECHANISM FOR AN END FINISHING TOOL

[75] Inventor: James A. Moruzzi, Sherborn, Mass.

[73] Assignee: Esco Technologies, Inc., Medfield, Mass.

[21] Appl. No.: 316,221

[22] Filed: Sep. 30, 1994

[51] Int. Cl.$^6$ ............................................. B23C 3/02
[52] U.S. Cl. ........................... 409/179; 82/113; 408/82
[58] Field of Search .......................... 408/80, 81, 82; 82/113; 409/179

[56] References Cited

U.S. PATENT DOCUMENTS

| | | | |
|---|---|---|---|
| 2,035,687 | 3/1936 | Briegel | 408/80 |
| 4,470,734 | 9/1984 | Miller | 80/113 |
| 4,620,823 | 11/1986 | Hillestad | 82/113 |

FOREIGN PATENT DOCUMENTS 1838  6/1982  WIPO .................................. 82/113

*Primary Examiner*—Daniel W. Howell
*Attorney, Agent, or Firm*—Iandiorio & Teska

[57] ABSTRACT

An end finishing tool includes a mandrel with a plurality of ribs at its distal end; an actuator longitudinally moveable in a first direction relative to the mandrel for moving the ribs radially outwardly in the installation mode to grip the inner surface of a conduit to be finished and in a second opposite direction for enabling the ribs to move radially inwardly in the extraction mode; an actuator driver threadably engaged with the actuator for driving the actuator in the first and second directions and a clamp release device for arresting movement of the actuator driver in the extraction mode for compelling the actuator to move in the second direction for enabling the ribs to move radially inwardly and release the inner surface of the conduit.

12 Claims, 3 Drawing Sheets

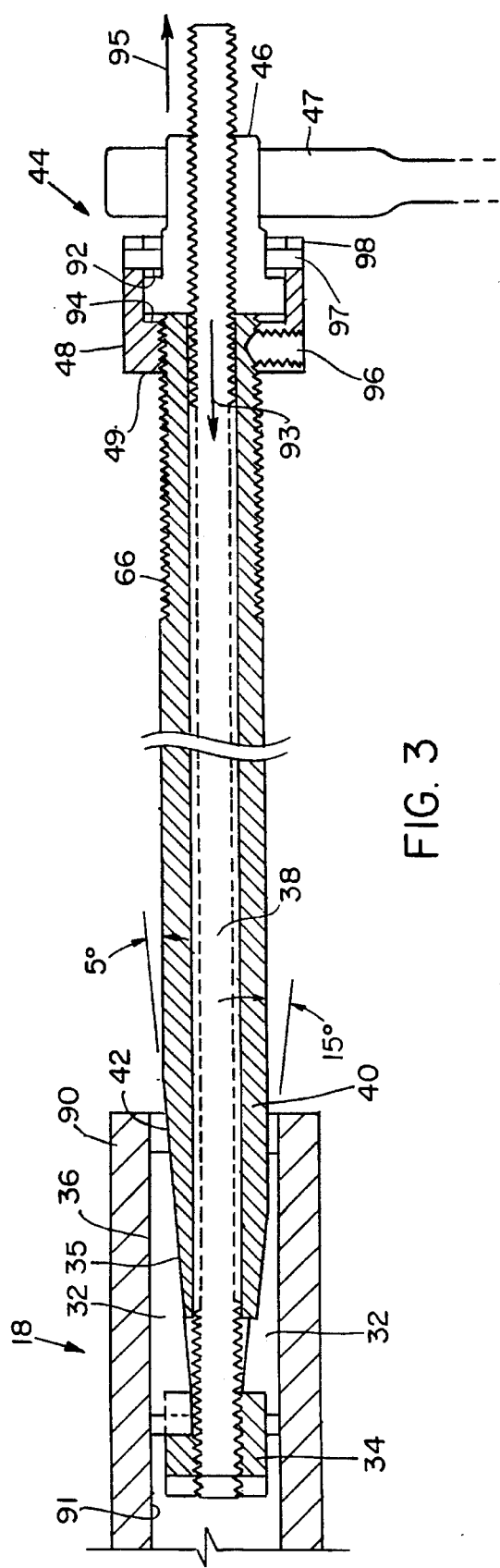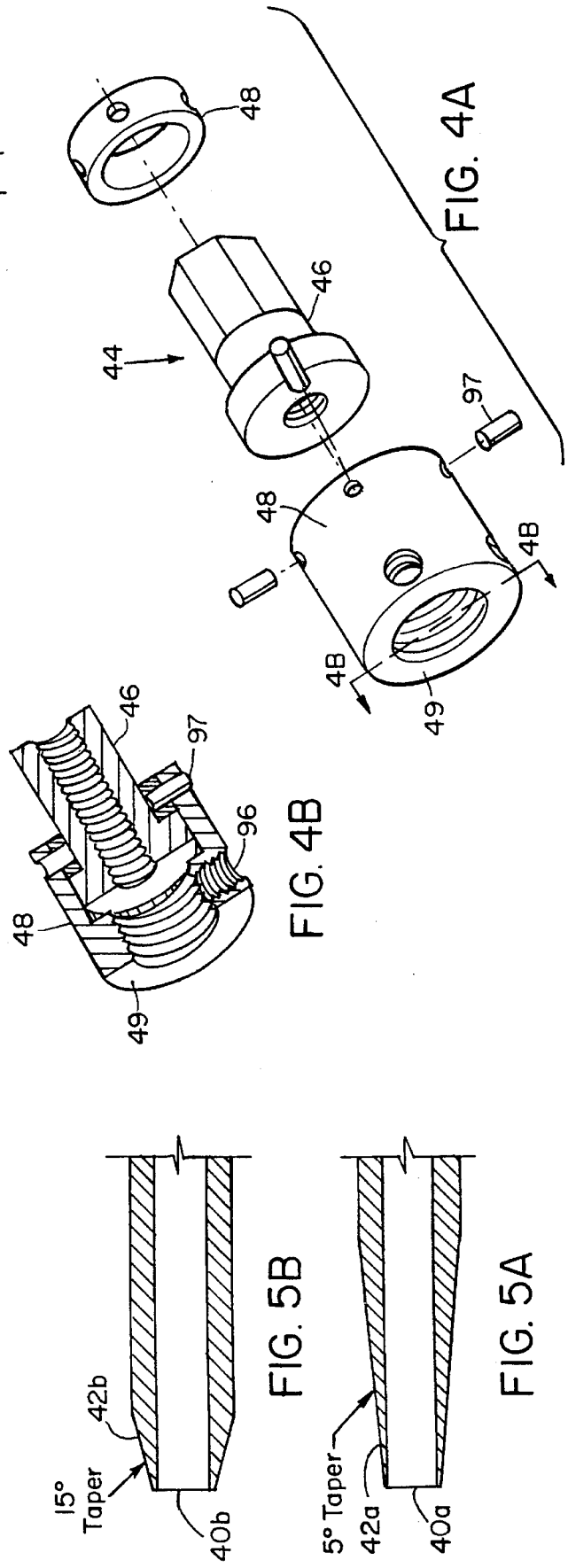

CLAMP RELEASE MECHANISM FOR AN END FINISHING TOOL

FIELD OF INVENTION

This invention relates to an end finishing tool for finishing the ends of pipes and tubes, and more particularly to such a tool having a clamp release mechanism for extracting an installed such tool.

BACKGROUND OF INVENTION

Boiler tubes or water-wall tubes are used to carry high pressure steam. These tubes or pipes are generally disposed about the periphery of a firebox where the high pressure steam is generated and used to drive steam turbines which in turn drive electric generators. Such tubes or pipes must be periodically repaired and replaced because they operate under high pressure and corrosive conditions which cause serious wear and even destruction of the tubes or pipes. The discussion herein uses the term tube, but it should be understood that the invention applies to tools used to finish tubes, pipes or any other types of conduits. The damaged portions of the tubes are cut out and an end finishing tool is used to finish the ends of the tubes for subsequent welding or other joining techniques for installation of new tubes or parts thereof. The end finishing tool must be securely fastened to the end of the tube to be finished. This is typically done by using on the distal end of the tool a clamp which fits into the tube and has a number of ribs which can be driven radially outwardly to grip the inner surface of the tube. Then the machining or finishing of the end of the tube is done and the clamp is backed off and the tool extracted. Clamping is improved by using a more gentle taper as opposed to a sharper taper on the camming surface which drives the ribs: the gentler the taper incline the more contact surface there is available to drive the ribs radially outwardly. However, the greater contact area makes it more difficult to release the ribs when the tool is to be extracted. One technique used by the laborer to release the ribs is to wiggle the tool but this is not very successful, especially with the good grip obtained with the gentle taper. Often the laborer is forced to take a hammer to the actuator rod which can damage or wholly incapacitate the tool so that manual machining must be done until the tool can be replaced or repaired.

SUMMARY OF INVENTION

It is therefore an object of this invention to provide a clamp release mechanism for an end finishing tool.

It is a further object of this invention to provide such a clamp release mechanism which is simple and rugged and positively releases the clamping force for extraction of the end finishing tool.

It is a further object of this invention to provide such a clamp release mechanism which enables the positive release of the clamp force without wiggling or striking of the tool.

It is a further object of this invention to provide such a clamp release mechanism which enables the positive release of the clamp force smoothly, effortlessly and automatically.

It is a further object of this invention to provide such a clamp release mechanism which enables the positive release of the clamp force smoothly and without danger of injury to the tool.

The invention results from the realization that a truly gentle and automatic release of a clamping mechanism for an end finishing tool can be achieved by providing a clamp release device which provides a surface or stop to arrest longitudinal movement of the draw rod driver and transfer the motion from the draw rod driver to the draw rod, and then to the actuator to release the clamping force on the ribs which engage the inner surface of a tube whose end is to be finished.

This invention features an end finishing tool having a mandrel with a plurality of ribs at a distal end. There is an actuator longitudinally movable in a first direction relative to the mandrel for moving the ribs radially outwardly in the installation mode to grip the inner surface of a conduit to be finished and in a second opposite direction for enabling the ribs to move radially inwardly in the extraction mode. There is also an actuator driver threadably engaged with the actuator for driving the actuator in the first and second directions. There is a clamp release device for arresting movement of the actuator driver in the extraction mode for compelling the actuator to move in the second direction for enabling the ribs to move radially inwardly and release the inner surface of the conduit.

In a preferred embodiment the mandrel may include a plurality of longitudinal grooves tapered at a predetermined incline toward the distal end of the mandrel. Each rib may include a tapered surface complementary with the predetermined incline for engaging the grooves in a second surface generally parallel to the longitudinal axis of the mandrel. A predetermined incline may be approximately 5°. There may be three ribs which may be equally spaced 120° about said mandrel. The clamp release device may include a housing which threadably engages proximate one end with the mandrel and which includes an arresting surface proximate the other end for engaging and arresting movement of the actuator driver.

This invention also features an end finishing tool which includes a mandrel having a longitudinal axis and a plurality of longitudinal grooves tapered at a predetermined incline toward the distal end of the mandrel. There are a plurality of longitudinal ribs and each rib has a tapered surface complementary with a predetermined incline for engaging the grooves and a second surface generally parallel to the longitudinal axis of the mandrel. There is also a draw rod and an actuator fixed to the distal end of the draw rod for engaging the distal ends of the ribs. Further included is a draw rod driver threadably engaged with the draw rod and rotatable in a first direction in the installation mode for drawing in the draw rod and actuator to draw the ribs longitudinally in the grooves toward the draw rod driver and drive the ribs radially outwardly to engage the inner surface of a conduit to be finished and rotatable in a second opposite direction in the extraction mode. There is a clamp release device for arresting movement of the draw rod driver in the extraction mode for compelling the draw rod and actuator to move away from the draw rod driver and enabling the ribs to move radially inwardly to release the inner surface of the conduit.

In a preferred embodiment the predetermined incline may be approximately 5°. There may be three ribs and the ribs may be equally spaced 120° about the mandrel. The clamp release device may include a housing which threadably engages proximate one end with the mandrel and which includes an arresting surface proximate the other end for engaging or arresting movement of the draw rod driver.

DISCLOSURE OF PREFERRED EMBODIMENT

Other objects, features and advantages will occur to those skilled in the art from the following description of a preferred embodiment and the accompanying drawings, in which:

FIG. 3 is a cross-sectional view similar to the view of FIG. 2 depicting the mandrel inserted within a section of tubing to be finished with the ribs in the expanded clamping position;

FIG. 4A is an exploded three dimensional view of the clamp release housing of FIGS. 2 and 3;

FIG. 4B is a cross-sectional view of the clamp release housing of FIG. 4A taken along line 4B—4B of FIG. 4A;

FIG. 5A is a side elevational view of one mandrel with a 5° taper; and

FIG. 5B is a side elevational view of one mandrel with a 15° taper.

Figure 1:
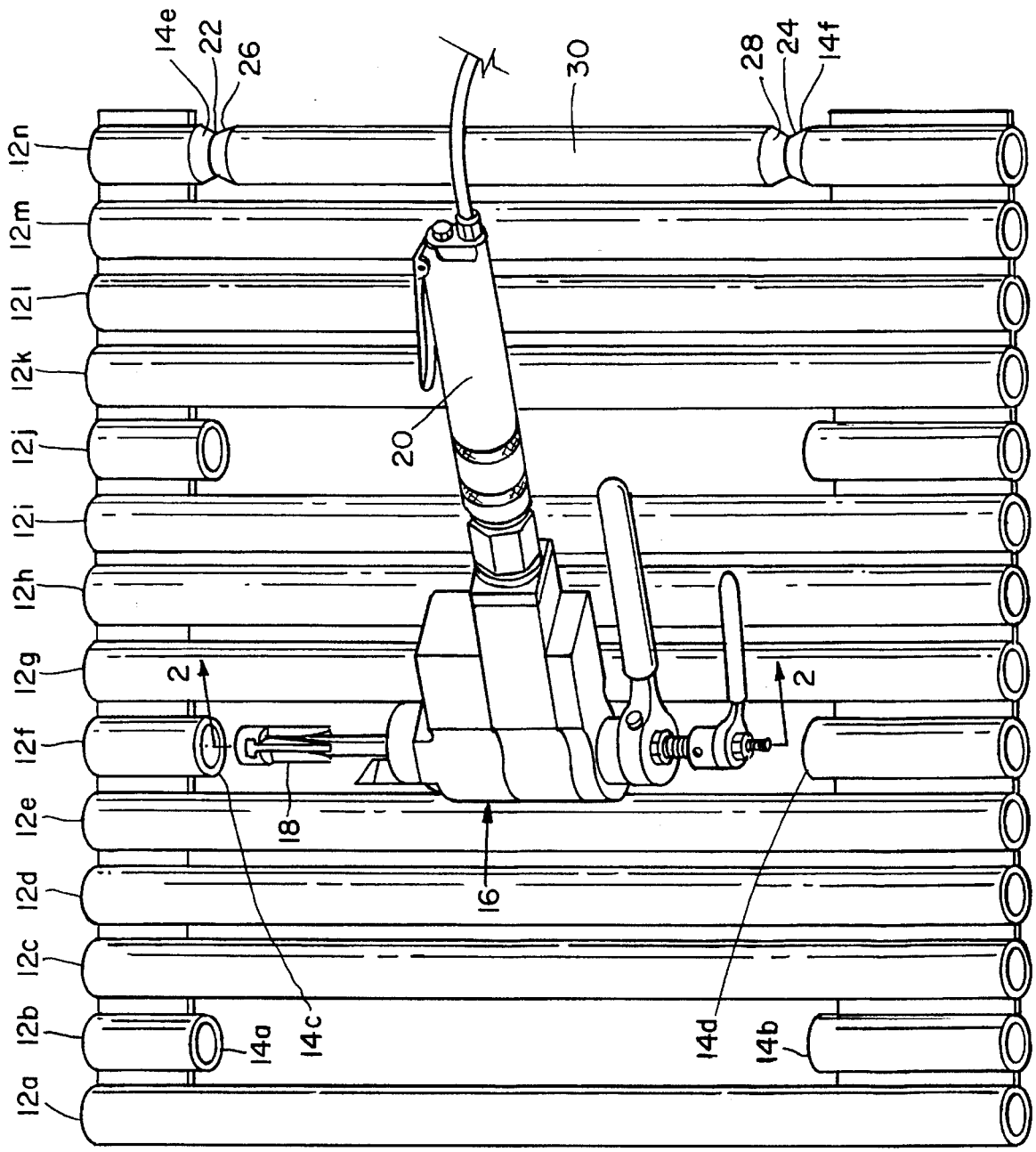
FIG. 1 is a perspective view of a bank of water-wall tubes and an end finishing tool in accordance with this invention disposed in a space where a defective tube section has been removed.

There is shown in FIG. 1 a portion of a bank 10 of water-wall tubes 12a-n. A portion of tube 12b has been removed for repair leaving rough end surfaces 14a, 14b and a portion of tube 12f has been removed leaving rough end surfaces 14c and 14d with end finishing tool 16 disposed between these end stirfaces. The space between the end surfaces may be as small as approximately 1½" wide and 13" long.

Engagement head 18 of end finishing tool 16 driven by air motor 20 may be engaged with end surface 14c so that the surface may be finished. Once engaged tool 16 is used to bevel the end stirface of the tube at an angle of approximately 37.5°, which is standard in the industry, or whatever configuration is required, to prepare it for subsequent welding. End surface 14d and the end surfaces of a replacement tube section would be similarly beveled and the replacement tube section installed and welded in place and the repair would be complete. A completed repair is shown in tube 12n where bevels 22 and 24 of end surfaces 14e and 14f, respectively, have been completed. Also, bevels 26 and 28 of the ends of replacement tube section 30 have been completed and tube section 30 has been installed and is ready for welding in place.

Figure 2:
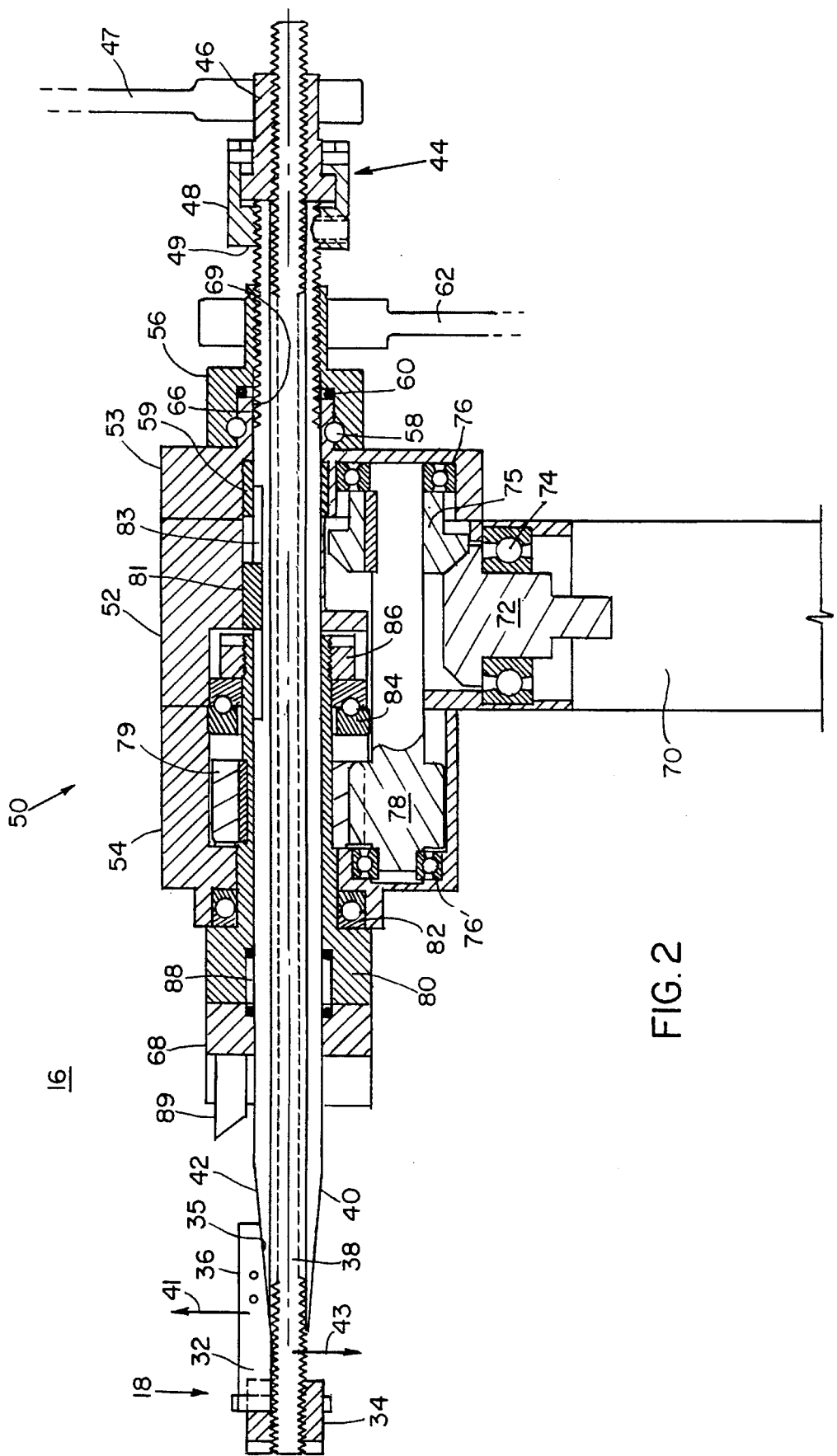
FIG. 2 is a cross-sectional view of the end finishing tool of FIG. 1 taken along line 2—2 of FIG. 1.

A cross-sectional view of end finishing tool 16 taken along line 2—2 of FIG. 1 is shown in FIG. 2. Engagement head 18 includes a number of ribs 32 (only one of which is shown) for engaging and gripping the inner stirfaces of the tube the end of which is to be finished. Typically it includes three ribs spaced at 120° apart. The distal ends of ribs 32 are engaged with actuator 34 and the other ends of the ribs have a first tapered surface 35 and a second flat stirface 36. Mandrel 40 has a plurality of longitudinal grooves 42 (only one shown) inclined at an angle complementary to the angle of the tapered surface 35 of ribs 32 for engaging the ribs. Draw rod 38 is disposed within and is axially moveable within mandrel 40.

In use, engagement head 18 is inserted in a tube, the end of which is to be finished, and draw rod 38 is axially retracted within mandrel 40 thereby causing actuator 34 and ribs 32 to retract and expand radially outwardly in the direction of arrow 41 so as to engage the inner surface of the tube to securely grip the tube and hold it in place for beveling (described below). After beveling is complete draw rod 38 is caused to move in the opposite direction away from the end of mandrel 40 thereby causing actuator 34 and ribs 32 to also be drawn away from the end of mandrel 40 and the surface 36 of ribs 32 to be moved radially inwardly in the direction of arrow 42 to positively release the inner surface of the tube.

Draw rod 38 at its other end is interconnected with clamp release system 44. Specifically, draw rod 38 is threadably engaged with draw rod driver 46 which includes rachet wrench 47 for rotating draw rod driver 46 in both the clockwise and counterclockwise directions for retracting and extending draw rod 38. Draw rod driver 46 is partially disposed within clamp release housing 48 which arrests movement of the draw rod driver 46 in both axial directions of movement to move the draw rod 38 also in both directions to enable ribs 32 to move radially inwardly and outwardly to engage and release the tube.

There is further included a housing portion 50 which is comprised of center, upper and lower housing sections 52, 53 and 54, respectively. Upper housing section 53 includes a feed knob 56 which includes ball bearing 58, bushing 59 and O-ring 60 as well as rachet wrench 62. The inner surface 64 of feed knob 56 is threadably engaged with the outer surface 66 of mandrel 40 and as rachet wrench 62 rotates feed knob 56 in the clockwise and counterclockwise directions mandrel 40 is extended and retracted axially within housing 50. Surface 49 of clamp release housing 48 acts as a stop for limiting the range of motion of mandrel 40.

When engagement head 18 is engaged with the inner surface of a tube to be finished, mandrel 40 may be retracted into housing 50 by feed knob 56 to bring the end of the tube into contact with the cutter blade 89 so that the end of the tube may be beveled at the appropriate angle and depth. Cutter head 68 is driven by airmotor 70. Air motor 70 rotates driving bevel gear 72 which is rotably supported by bearing 74. Drive bevel gear 72 in turn rotates driven bevel gear 75 which rotates spur gear 78 rotatably supported by bearings 76 and 76'. Spur gear 78 drives driven spur gear 79 which drives shaft 80 which causes cutter head 68 to rotate. Drive shaft 80 is rotatably supported by full complement radial thrust ball bearing assemblies 82 and 84 as well as retainer nut 86, needle bearing 88 and gear 79. There is also included within center housing 52 key 81 for absorbing torque while tool 16 is being operated. Keyway 83 in mandrel 40 enables axial movement of mandrel 40.

Clamp release system 44, mandrel 40 and engagement head 18 engaged with tube 90 are more clearly shown in FIG. 3. Draw rod 38 and actuator 34 are shown in the retracted position and ribs 42 are retracted but expand radially outwardly and engage and grip the inner surface 91 of tube 90. Clamp release system 44 enables draw rod 38 to be retracted and extended within mandrel 40 thereby enabling ribs 42 to expand radially outwardly to engage and grip inner surface 91 of tube 90 and to be extended thereby releasing and disengaging inner surface 91 of tube 90 when end finishing is complete. This is accomplished by retraction stop 92 and extension stop 94 in clamp release housing 48 of clamp release system 44. That is, when rachel 47 is operated to cause draw rod driver 46 to rotate in the clockwise direction, draw rod driver 46 translates in the direction of arrow 95 along draw rod 38 while mandrel 40 remains stationary. However, when draw rod driver 46 comes into contact with retraction surface 92 of mandrel 40 within clamp release housing 48 the movement of draw rod driver 46 ceases and draw rod 38 is caused to be translated in the direction of arrow 95 thereby causing actuator 34 and ribs 42 to be retracted and enabling engagement and gripping of inner surface 91 of tube 90. The cutter blade 89, FIG. 2, may then be engaged with the tube and the appropriate end finishing may be completed. Upon completion of end finishing, the ribs 42 must be disengaged from the inner starface 91 of tube 90. Normally, with prior art systems this is a very difficult task requiring the shaking and or hammering of the draw rod to cause the ribs to disengage with the inner surface of the tube being finished. With the present invention, however, ratchet 47 and draw rod driver 46 are rotated counter clockwise and draw rod driver 46 is translated along draw rod 38 in the direction of arrow 93. This translation continues until draw rod driver 46 comes into contact with extension surface 94 where the movement is then transferred to draw rod 38 in the direction of arrow 93. If the ratchet 47 is continued to be turned in the counterclockwise direction draw rod 38 is forced outwardly in the direction of 93 and actuator 34 and ribs 42 are also forced in this direction thereby positively releasing and disengaging ribs 42 from the inner surface 91 of tube 90. Threaded hole 96 receives a set screw to affix clamp release system 44 at a certain desired position along mandrel 40 setting the desired range of motion of mandrel 40. As can be seen in FIG. 2 surface 49 of clamp release housing 48 acts as a stop when ratchet wrench 62 is being rotated in the counterclockwise direction causing mandrel 40 to be translated in the direction of arrow 93 FIG. 3. Clamp release system 44 also includes roll pins 97 and retainer ring 98.

Clamp release system 44 is shown in an exploded three dimensional view in FIG. 4A and in a cross-sectional view in FIG. 4B taken along line 4B—4B of FIG. 4A.

FIGS. 5A and 5B depict two configurations of the mandrel according to this invention. In FIG. 5A there is shown mandrel 40a with tapered surface 42a with a 5° taper. This surface provides more surface contact between the mandrel and the complementary surface 35, FIG. 3, of rib 42 thereby providing a more flush contact between surface 36 of rib 42 and the inner surface of a tube for providing a better engagement and a more forceful grip. This more forceful grip is advantageous when the cutter blade and the tube are engaged for end finishing however, it makes release of the ribs difficult, thus necessitating the clamp release system of the present invention in order to obviate the destructive prior art techniques of shaking and/or hammering the draw rods to release the ribs. An alternative mandrel design is shown in FIG. 5B where mandrel 40b has a surface 42b with a 15° taper. This type of mandrel allows the ribs to be more easily released from engagement with a tube, however, it does not provide as strong a grip as the 5° taper because surface 42b has less surface contact with the complementary surface of the rib 35, FIG. 3. This results in rocking and shaking during engagement of the cutter blade with the tube.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An end finishing tool, comprising:

a mandrel with a plurality of ribs at its distal end;

an actuator longitudinally movable in a first direction relative to said mandrel for moving said ribs radially outwardly in the installation mode to grip the inner surface of a conduit to be finished and in a second opposite direction for enabling said ribs to move radially inwardly in the extraction mode;

an actuator driver threadably engaged with said actuator for driving said actuator in said first and second directions; and a clamp release device for arresting axial movement of said actuator driver in said extraction mode for compelling said actuator to move in said second direction for enabling said ribs to move radially inwardly and release the inner surface of said conduit.

2. The end finishing tool of claim 1 in which said mandrel includes a plurality of longitudinal grooves tapered at a predetermined incline toward the distal end of said mandrel.

3. The end finishing tool of claim 2 in which each said rib includes a tapered surface complementary with said predetermined incline for engaging said grooves and a second surface generally parallel to the longitudinal axis of said mandrel.

4. The end finishing tool of claim 2 in which said predetermined incline is approximately 5°.

5. The end finishing tool of claim 1 in which there are three said ribs.

6. The end finishing tool of claim 5 in which said ribs are equally spaced 120° about said mandrel.

7. The end finishing tool of claim 1 in which said clamp release device includes a housing which threadably engages proximate one end with said mandrel and which includes an arresting surface proximate the other end for engaging and arresting movement of said actuator driver.

8. An end finishing tool, comprising:

a mandrel having a longitudinal axis and a plurality of longitudinal grooves tapered at a predetermined incline toward the distal end of said mandrel;

a plurality of longitudinal ribs, each rib having a tapered surface complementary with said predetermined incline for engaging said grooves and having a second surface generally parallel to said longitudinal axis of said mandrel;

a draw rod;

an actuator fixed to the distal end of said draw rod for engaging the distal ends of said ribs;

a draw rod driver threadably engaged with said draw rod and rotatable in a first direction in the installation mode for drawing in said draw rod and actuator to draw said ribs longitudinally in said grooves toward said draw rod driver and drive said ribs radially outwardly to engage the inner surface of a conduit to be finished and rotatable in a second opposite direction in the extraction mode; and a clamp release device for arresting axial movement of said draw rod driver in the extraction mode for compelling said draw rod and actuator to move away from said draw rod driver and enabling said ribs to move radially inwardly to release the inner surface of the conduit.

9. The end finishing tool of claim 8 in which said predetermined incline is approximately 5°.

10. The end finishing tool of claim 8 in which there are three said ribs.

11. The end finishing tool of claim 10 in which said ribs are equally spaced 120° about said mandrel.

12. The end finishing tool of claim 8 in which said clamp release device includes a housing which threadably engages proximate one end with said mandrel and which includes an arresting surface proximate the other end for engaging and arresting movement of said draw rod driver.

* * * * *